(12) United States Patent
Van De Sluis et al.

(10) Patent No.: US 9,185,778 B2
(45) Date of Patent: Nov. 10, 2015

(54) DYNAMIC LIGHTING ARRANGEMENT FOR PRODUCT PRESENTATION

(75) Inventors: Bartel Marinus Van De Sluis, Eindhoven (NL); Anthonie Hendrik Bergman, Nuenen (NL); Johanna Cornelia Maria Francisca Tielens, Deurne (NL); Christopher Schutte, Milan (IT); Johannes Petrus Wilhelmus Baaijens, Eindhoven (NL); Geradus Antonius Maria Bagen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 846 days.

(21) Appl. No.: 13/320,287

(22) PCT Filed: May 7, 2010

(86) PCT No.: PCT/IB2010/052014
§ 371 (c)(1),
(2), (4) Date: Jan. 27, 2012

(87) PCT Pub. No.: WO2010/131170
PCT Pub. Date: Nov. 18, 2010

(65) Prior Publication Data
US 2012/0112668 A1 May 10, 2012

(30) Foreign Application Priority Data

May 14, 2009 (EP) .................................. 09160269

(51) Int. Cl.
*H05B 37/02* (2006.01)

(52) U.S. Cl.
CPC ........ *H05B 37/0227* (2013.01); *H05B 37/0218* (2013.01); *H05B 37/0272* (2013.01)

(58) Field of Classification Search
CPC .. H05B 33/05; H05B 33/0869; H05B 33/872; H05B 41/2855; H05B 41/38; H05B 41/3922
USPC .......... 315/185 S, 209 R, 224, 307–326, 291, 315/149–159
See application file for complete search history.

(56) References Cited

U.S. PATENT DOCUMENTS 6,933,685 B2  8/2005 Gutta et al.
7,410,271 B1  8/2008 Man
(Continued)

FOREIGN PATENT DOCUMENTS

DE  19623188 A1  12/1997
FR  2624712 A1  6/1989
(Continued)

*Primary Examiner* — Tuyet Vo
(74) *Attorney, Agent, or Firm* — Meenakshy Chakravorty

(57) ABSTRACT

A lighting arrangement for presentation of a first object is disclosed. The arrangement comprises an accent lighting assembly and a decoration lighting assembly. The accent lighting assembly is arranged to provide illumination of the first object, has at least one accent light characteristic, and comprises at least one accent light generating device. The decoration lighting assembly is arranged to provide background lighting of the first object, has at least one decoration light characteristic, and comprises at least one decoration light generating device. The arrangement also comprises at least one sensor, arranged to detect a distance between the sensor and a second object and to generate a signal value representing the distance, and a controller arranged to receive the signal value from the at least one sensor and to adapt the accent light characteristic and the decoration light characteristic based on the signal value. Corresponding use, method and computer program product are also disclosed.

10 Claims, 5 Drawing Sheets

(56) References Cited

U.S. PATENT DOCUMENTS

| | | |
|---|---|---|
| 2006/0244717 A1 | 11/2006 | Ohlson |
| 2007/0060578 A1 | 3/2007 | Player et al. |
| 2008/0218493 A1 | 9/2008 | Patten et al. |
| 2008/0312946 A1 | 12/2008 | Valentine et al. |
| 2009/0086497 A1* | 4/2009 | Kamioka et al. ............. 362/466 |
| 2009/0310348 A1* | 12/2009 | Laski et al. ................... 362/231 |
| 2010/0115683 A1* | 5/2010 | Krans et al. ....................... 2/115 |
| 2011/0248194 A1* | 10/2011 | Svajda et al. ................. 250/552 |

FOREIGN PATENT DOCUMENTS

| | | |
|---|---|---|
| JP | 2002299076 A | 10/2002 |
| JP | 2008032272 A | 2/2008 |
| JP | 2009050591 A | 3/2009 |
| WO | 2008139364 A1 | 11/2008 |

* cited by examiner

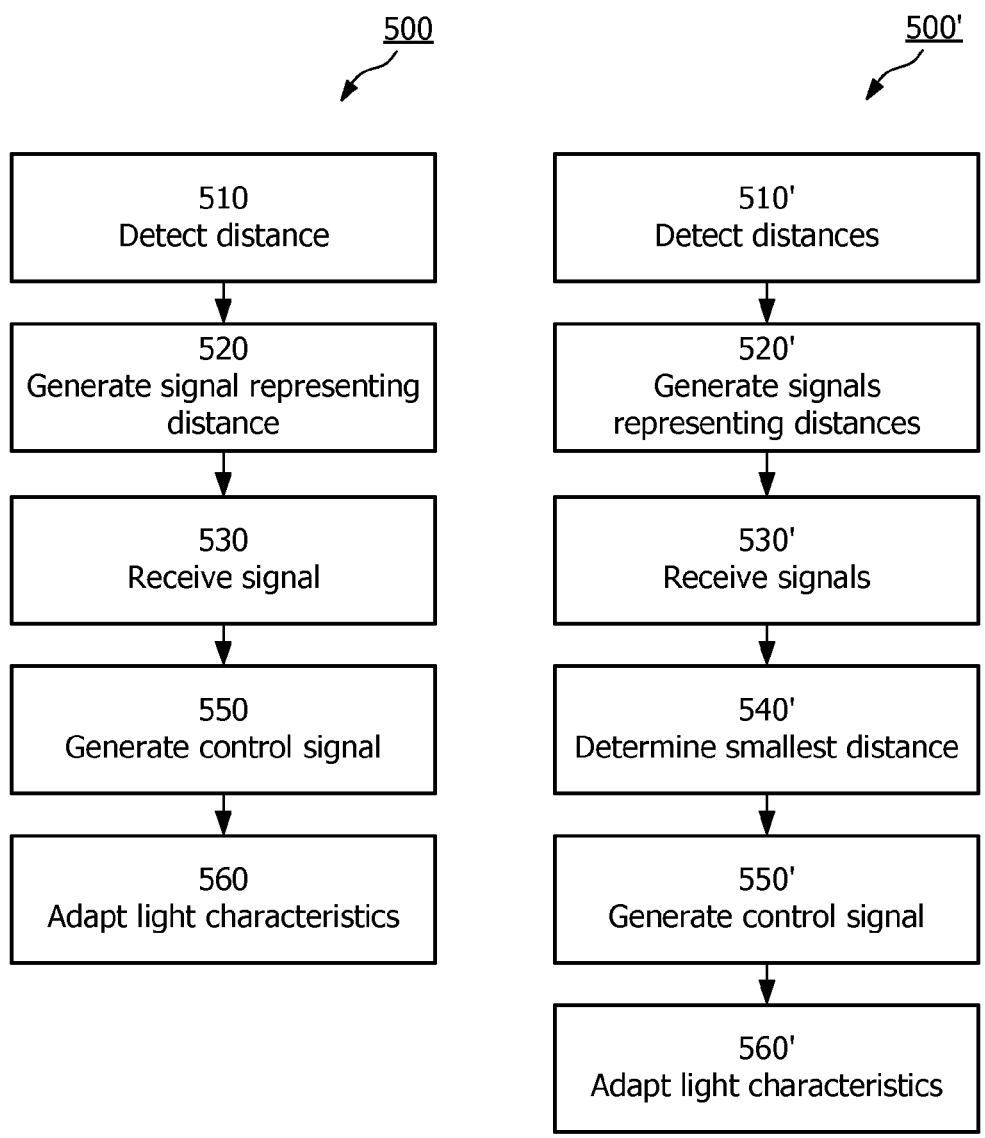

DYNAMIC LIGHTING ARRANGEMENT FOR PRODUCT PRESENTATION

FIELD OF THE INVENTION

The present invention relates generally to the field of lighting arrangements, and to the use and control of such arrangements. More particularly, it relates to lighting arrangements, and to the use and control of such arrangements.

BACKGROUND OF THE INVENTION

When a product is to be presented, for example to a customer or potential buyer, parameters not directly linked to the product itself may create visible effects in relation to the product presentation. For example, a particular background color or pattern may enhance the colors of the product itself and make the product stand out from the environment. Another example is that light having particular wavelengths and/or having a particular angle of incidence in relation to the product may also create effects of the product display.

A problem related to product presentation is that a parameter setting that is optimal for attracting distant viewers of the product on display may not be optimal for presenting the product to a nearby viewer and vice versa.

Therefore, there is a need for improved and more dynamic lighting arrangements (i.e. systems) for product presentation.

SUMMARY OF THE INVENTION

It is an object of the invention to obviate at least some of the above disadvantages and to provide improved and more dynamic lighting arrangements for product presentation. Accordingly, embodiments of the present invention preferably seek to mitigate, alleviate or eliminate one or more of the above-identified deficiencies in the art and disadvantages singly or in any combination and solve at least some of the above mentioned problems by providing a lighting arrangement for product presentation, along with corresponding use, method and computer program product, according to the appended patent claims.

According to a first aspect of the invention, this is achieved by a lighting arrangement for presentation of a first object comprising an accent lighting assembly, a decoration lighting assembly, at least one sensor and a controller. The accent lighting assembly has at least one accent light characteristic, comprises at least one accent light generating device, and is arranged to provide illumination of the first object. The decoration lighting assembly has at least one decoration light characteristic, comprises at least one decoration light generating device, and is arranged to provide background lighting of the first object. The at least one sensor is arranged to detect a distance between the sensor and a second object and to generate a signal value representing the distance, and the controller is arranged to receive the signal value from the at least one sensor and to adapt the accent light characteristic and the decoration light characteristic based on the signal value.

The accent light characteristic may, in some embodiments, comprise at least one of: a hue, a saturation, a lighting direction, a beam angle, a lighting pattern, and a light dynamics.

The decoration light characteristic may, in some embodiments, comprise at least one of: an intensity, a hue, a saturation, a lighting direction, an illumination area, a lighting pattern, and a light dynamics.

In some embodiments, the at least one accent light generating device may comprise at least one of: a lamp, a spotlight, a light emitting diode—LED, a halogen luminary, a fluorescent luminary, and an incandescent luminary.

In some embodiments, the at least one decoration light generating device may comprise at least one of: a light emitting diode—LED—display, a spotlight, a lamp, a plasma screen, RGB lighting elements, a LED panel, a pixilated LED panel, a light guide, an electronic display, a liquid crystal display—LED—screen, a three dimensional—3D—display, and an LCD projection.

The lighting arrangement may comprise a plurality of sensors in some embodiments. In such embodiments, the controller may be arranged to: receive a respective signal value from each of the plurality of sensors and adapt the accent light characteristic and the decoration light characteristic based on a selected one of the respective signal values. In some embodiments, the controller may be arranged to adapt the accent light characteristic and the decoration light characteristic based on the respective signal value representing the smallest distance.

In some embodiments, the controller may be arranged to compare the signal value to a threshold value. If the signal value does not exceed the threshold value, the controller may set the accent light characteristic and the decoration light characteristic to a first predetermined setting, and if the signal value exceeds the threshold value, the controller may set the accent light characteristic and the decoration light characteristic to a second predetermined setting.

According to some embodiments, the at least one sensor may be adapted to detect movement and/or temperature of the second object, and generate the signal value representing the distance based on the movement and/or temperature detection. In some embodiments, the signal value representing the distance is generated only if the movement and/or temperature detection indicates that the second object is a human.

In some embodiments, the controller may be arranged to compare the signal value to first and second threshold values. If the signal value does not exceed any of the first and second threshold value, the controller may set the accent light characteristic and the decoration light characteristic to a first predetermined setting. If the signal value exceeds the first and second threshold value, the controller may set the accent light characteristic and the decoration light characteristic to a second predetermined setting. If the signal value exceeds the first threshold value and does not exceed the second threshold value, the controller may set the accent light characteristic and the decoration light characteristic to a third setting, wherein the third setting is a function of the signal value, and the function is such that, if the signal value shifts gradually from the first threshold to the second threshold the third setting shifts gradually from the first predetermined setting to the second predetermined setting.

A second aspect of the invention is use of the lighting arrangement of the first aspect for presentation of the first object.

A third aspect of the invention is a method of controlling a lighting arrangement for presentation of a first object. The method comprises detecting (at a sensor of the lighting arrangement) a distance between the sensor and a second object, generating (at the sensor) a signal value representing the distance, and receiving (at a controller of the lighting arrangement) the signal value from the sensor. The method further comprises adapting (by generation at the controller of at least one control signal based on the signal value) an accent light characteristic of an accent lighting assembly and a decoration light characteristic of a decoration lighting assembly. The accent light assembly comprises at least one accent light generating device, and is arranged to provide illumination of the first object. The decoration lighting assembly comprises at least one decoration light generating device, and is arranged to provide background lighting of the first object.

A fourth aspect of the invention is a computer program product comprising a computer readable medium, having thereon a computer program comprising program instructions, the computer program being loadable into a data-processing unit and adapted to cause the data-processing unit to control a lighting arrangement for presentation of a first object by execution of at least the following steps when the computer program is run by the data-processing unit: receiving a signal value from a sensor, the signal value representing a distance between the sensor and a second object; and adapting, (by generation at the controller of at least one control signal based on the signal value) an accent light characteristic of an accent lighting assembly and a decoration light characteristic of a decoration lighting assembly. The accent light assembly comprises at least one accent light generating device, and is arranged to provide illumination of the first object. The decoration lighting assembly comprises at least one decoration light generating device, and is arranged to provide background lighting of the first object.

In some embodiments, the second, third and fourth aspects of the invention may additionally have features identical with or corresponding to any of the various features as explained above for the first aspect of the invention.

Further embodiments of the invention are defined in the dependent claims.

An advantage of some embodiments of the invention is that lighting parameters of the product presentation may be adapted based on the distance to a viewer of the product display.

Another advantage of some embodiments of the invention is that both accent lighting and decoration lighting may be adapted based on the distance to a viewer of the product display.

Yet another advantage of some embodiments of the invention is that if there are several viewers of the product display, the lighting parameters of the product presentation may be adapted based on the distance to the viewer being closest to the product display.

Another advantage of some embodiments of the invention is that a smooth transition is enabled between a lighting parameter setting suitable for distant viewers and a lighting parameter setting suitable for nearby viewers.

Another advantage of some embodiments of the invention is that the presentation style of a product display may be changed quickly and automatically.

These and other aspects of the invention will be apparent from and elucidated with reference to the embodiments described hereinafter.

BRIEF DESCRIPTION OF THE DRAWINGS

These and other aspects, features and advantages of which the invention is capable of will be apparent and elucidated from the following description of embodiments of the present invention, reference being made to the accompanying drawings, in which

FIGS. 5A-D are flowcharts illustrating example method steps according to some embodiments of the invention.

DETAILED DESCRIPTION OF EMBODIMENTS

Figure 1:
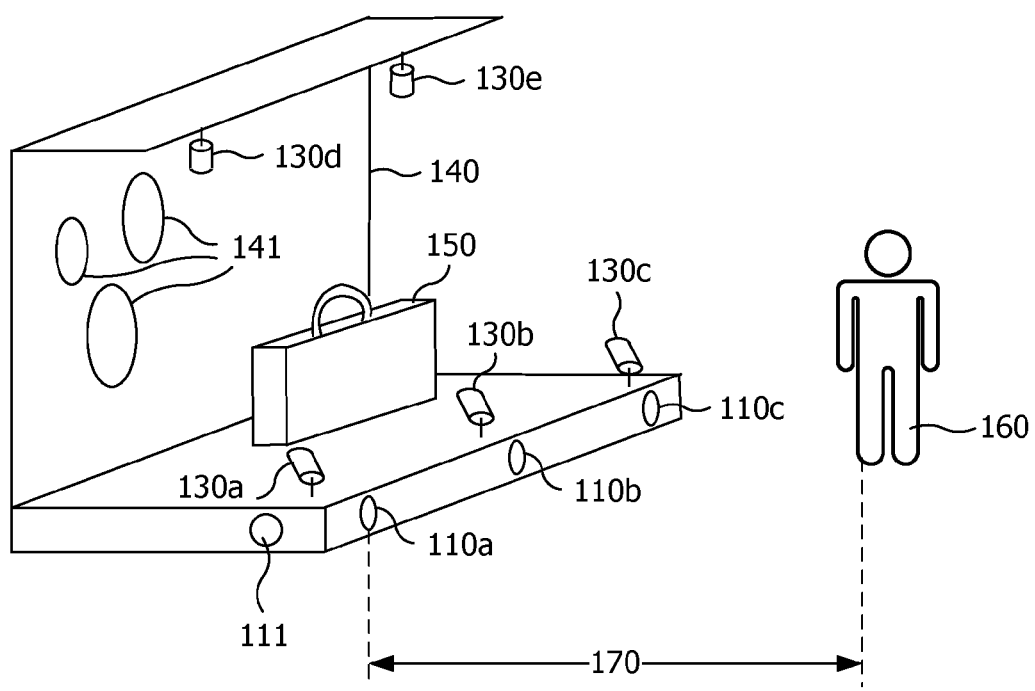
FIG. 1 is a schematic illustration of a product display with an example lighting arrangement according to some embodiments of the invention and a viewer of the display.

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

When a product is on display, for advertisement or other purposes (e.g. in a shop or in a window), there may be a benefit with having the display adapt to various situations such as the proximity of a viewer. For example, fashion retailers may want to present their products and accessories in a way that attracts potential buyers when they are far from the product display (which may be achieved, for example, by having the display stand out from the surroundings, e.g. by using prominent decoration effects or a mysterious illumination to evoke curiosity) and in a flattering and realistic way when the potential buyer is close to the display (which may be achieved, for example, by using close to day light lighting and without prominent decoration effects). Such different ways of presenting a product may be referred to as presentation styles.

In the following, embodiments of the invention will be described where light characteristics (for example in the form of various parameters) of an accent lighting assembly and a decoration lighting assembly may be adapted in relation to a distance between a sensor and an object.

Such a lighting arrangement (for example in the form of an instant color display—ICD) may be part of a product display, which may, for example, have the shape of a cube, a shelf or a back wall with products in front of it.

Accent lighting is defined as lighting arranged to illuminate a product, and is characterized by light sources directed at the product. In some embodiments, accent lighting may create a presentation of the product on display by directed illumination to make the product appear with a high contrast to the surroundings of the product. The accent lighting assembly comprises at least one light generating device, which may include, for example, spotlights or other luminaries using lamps (e.g. of type LEDs (light emitting diodes), halogen, fluorescent or incandescent. Lamps and spotlights may be used in combination with color filters and/or pattern filters. According to some embodiments, it may be preferable to use light sources that can be dimmed and easily varied in color, e.g. LED lighting.

Decoration lighting is defined as lighting arranged to provide background lighting of a product (i.e. lighting around, behind and/or close to the product), and is characterized by light sources that do not primarily illuminate the product but rather the nearby surroundings of the product. It is emphasized that background lighting may include (but is not limited to) lighting of any surface of a product display; e.g. a horizontal surface such as a floor or a ceiling, and/or a vertical surface such as a wall. The decoration lighting assembly comprises at least one light generating device, which may include, for example, one or more LED-displays, LED panels, pixilated LED panels, spotlights, lamps, integrated light guides (e.g. in a surface of a product display such as a shelf), and/or electronic displays such as plasma screens, LCD (liquid crystal display) screens, 3D displays or LCD projection. Color lighting can be created behind (or in the vicinity of) a product by, for example, applying a LED panel as back wall or other surface or by 'wall-washing' a back wall or other surface with RGB (red/green/blue) lighting elements. Decoration lighting may include a halo-creating light source (e.g. above the product). Lamps and spotlights may be used in combination with color filters, pattern filters and/or more permanent colored/patterned decoration (e.g. paint, fabric) of surfaces of the display.

The light characteristics may include, but are not limited to, the light intensity, the direction of light, the light spreading angle (i.e. the beam angle), the color/hue of the light (i.e. the wavelength composition), the saturation, the light pattern (or color pattern for e.g. a LED-display), the illumination area, and/or the dynamics of the light (e.g. how much movement there is in a background pattern, or how often an accent lighting color changes in an attraction mode (distant viewer mode) if pulsating colors are used).

Typical variable accent light characteristics may include: direction of the light (change realized, e.g., by using multiple accent lighting spotlights with different orientations in relation to the product), hue, saturation (e.g. by using a RGB LED spotlight), pattern (e.g. by using pixilated LED spotlights—a spotlight comprising multiple LEDs which can be controlled individually), and dynamics (e.g. by using a liquid crystal cell in front of a light source, and/or by adjusting any other parameter as a function of time).

Typical variable decoration light characteristics may include: hue, saturation, intensity, pattern (e.g. a pattern or other image shown on a pixilated LED panel), and level of dynamics (e.g. by adjusting any other parameter as a function of time).

In some embodiments, each light source may be controlled individually. For some settings one or more of the light sources may even be switched off according to some embodiments.

There may be one or more sensors adapted to detect a distance between the sensor and an object (e.g. a viewer of a product display). Each sensor generates a signal which represents the detected distance and the respective signal is conveyed to a controller.

The controller adapts the light characteristics of the accent lighting assembly and the decoration lighting assembly in relation to the signal(s) thus received. To this end, the controller may generate one or more control signals, which are conveyed to each of the elements of the accent lighting assembly and the decoration lighting assembly.

In some embodiments, there may be several distance sensors. These sensors may be aimed at different directions to detect viewers approaching from different directions, or in a same direction (e.g. if there is only one realistic direction for the viewers to approach the display).

In the situation with several sensors, the controller has to decide how to use the respective distance representing signals. In some embodiments, the controller uses the signal representing the smallest distance to adapt the lighting characteristics. In some embodiments, other criteria may be applied, e.g. using a median or average distance value, or using the signal representing the smallest distance among those distances that are above a minimum distance threshold. The latter alternative may be used to avoid that a blocked sensor forces the lighting arrangement into a constant presentation mode (nearby viewer mode).

In some embodiments of the invention, one or more of the sensors comprise a detector of movement and/or temperature. For example, such a sensor could be a sensor that detects moving infrared radiation (as emitted by humans). In some embodiments, distance representing signals are only generated if the measured temperature of an object is within a range that matches conventional human temperature. In some embodiments, distance representing signals are only generated if movement of an object is detected. In some embodiments, distance representing signals are only generated if the measured temperature of an object is within a range that matches conventional human temperature and movement of the object is detected. In some embodiments, a sensor may be set to measure the presence of humans only in a certain distance range from the product display. Thus, in some embodiments of the invention the appearance of a product display (both the accent lighting and decorative lighting) depends on the distance between a viewer and the sensor(s). When the viewer is at a large distance, the appearance may be set to attract the attention of potential buyers and to make them curious so that they will come closer. When the viewer is close to the display, the appearance may be set so that the product is presented in a way that makes all details visible, and seduces the viewer to buy the product.

An example of a specification for the lighting modes may be as follows.

Attraction mode:
Accent lighting:
Direction=upwards
Saturation=50%
Dynamics=Medium
Light pattern=structure (e.g. block pattern or light dots)
Decoration lighting:
Saturation=100%
Level of dynamics=80%
Pattern=None
Intensity=80%
Presentation mode:
Accent lighting:
Direction=downwards
Saturation=3%
Dynamics=0%
Light pattern=homogeneous
Decoration lighting:
Saturation=30%
Level of dynamics=0%
Pattern=None
Intensity=50%

The lighting settings can be gradually adapted depending on the detected distance. Alternatively, two or more different modes can be defined in relation to distance thresholds. For instance, two different modes can be defined, one for the situation in which a viewer is at a certain distance (e.g. >3 m) from the display, and one for the situation in which a viewer has come close (e.g. <3 m) to the display. The two alternatives (gradual change and different modes) may also be combined. One example of such an embodiment is that an attraction mode is used when the viewer is at a certain distance (e.g. >4 m) from the display, a presentation mode is used when the viewer has come close (e.g. <2 m) to the display, and for distance in between a gradual change between the attraction mode and the presentation mode is applied.

FIG. 1 is a schematic illustration of a display of a product 150 and a viewer 160 of the display. The product display comprises an example lighting arrangement according to some embodiments of the invention. The lighting arrangement comprises accent light sources, namely spotlights 130a-e, and a LED-display 140 which serves as a decoration light source. The lighting arrangement also comprises distance sensors 110a-c mounted on the front of the product display and a distance sensor 111 facing a different direction that the sensors 110a-c face.

At present, a viewer 160 is at a distance 170 from the product display, which is detected by sensor 110a. The sensor 110a consequently generates a signal which represents the distance 170 and this signal is conveyed to a controller (not shown). The controller reacts to this signal by adapting parameters of the accent lighting and the decoration lighting based on the detected distance. The controller may, for example, adapt the hue and saturation of spotlights 130a-c, switch off spotlights 130d-e, and change the pattern and dynamics of the LED-display image 141.

In some embodiments an accent lighting mode (e.g. colored lights) is used when the viewer is at a large distance. The mode may then gradually change to a presentation mode (e.g. white light) as the viewer distance reduces.

In some embodiments the distance to a viewer controls the size of the illuminated area. For example, when a viewer is at a large distance a large area around the product may be illuminated by the decorative lighting, while when the viewer is at a small distance a focused, small area around the product may be illuminated by the decorative lighting.

In some embodiments, dynamic and/or colorful lighting effects are used when the viewer is far from the display. In such embodiments, the lighting effects may migrate to a non-disturbing pure illumination mode as the viewer comes closer.

Figures 2A, 2B:
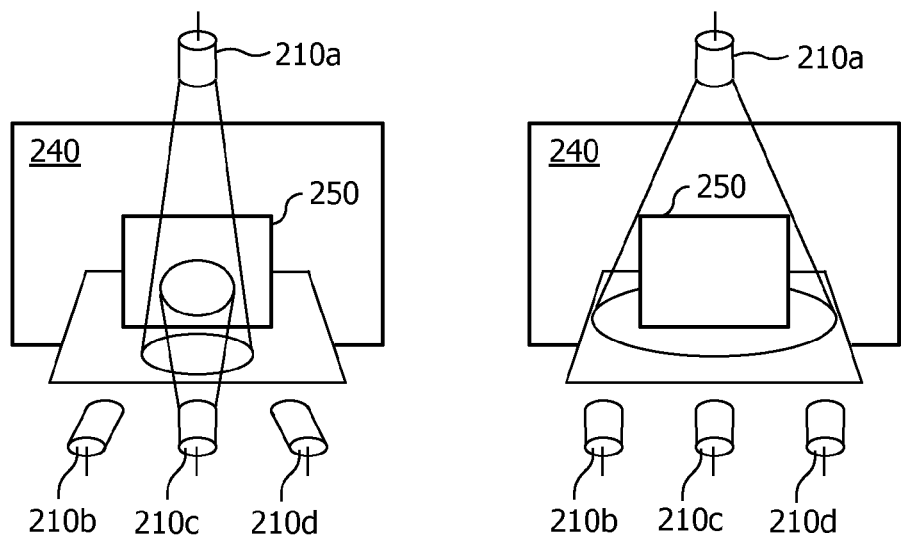
FIGS. 2A and B are schematic illustrations showing two different settings of an example lighting arrangement according to some embodiments of the invention.

FIGS. 2A and 2B show two different settings of an example lighting arrangement according to some embodiments of the invention. The lighting arrangement of FIGS. 2A and 2B is used to display a product 250. The lighting arrangement comprises accent light sources, namely spotlights 210a-d, and a LED-display 240 which serves as a decoration light source.

FIG. 2A illustrates an example attraction mode setting, which may be used when a detected distance from a sensor (not shown) to a viewer is larger than a predetermined value. In this example attraction mode the decorative lighting realized by the LED-display may be of an intense and saturated color. The accent lighting may employ lighting from below (i.e. spotlights 210b-d) or mainly from below as shown in FIG. 2A where spotlights 210a and c are used (spotlight 210a may have lower intensity than spotlight 210c in this mode).

FIG. 2B illustrates an example presentation mode setting, which may be used when a detected distance from a sensor (not shown) to a viewer is smaller than a predetermined value (which may or may not be the same as for the attraction mode above). In this example presentation mode the decorative lighting, realized by the LED-display, may be more subtle, for example by using low intensity and less saturation than in the attraction mode. The accent lighting may employ lighting from above as shown in FIG. 2B where spotlight 210a is used. The beam angle of spotlight 210a has also been increased to obtain a realistic presentation.

The spotlights may also employ different color filters (or other coloring effects) in different modes, and the direction of light may be changed (see position of spotlights 210b and d in FIGS. 2A and 2B respectively).

For instance, in an attraction mode a purple bag could be illuminated by purple light making it really stand out and glow from a distance. When a viewer comes closer, the accent lighting may switch to white light (e.g. as close to daylight as possible) so that the product may be seen in its natural colors. The transition from attraction mode to presentation mode may be gradual. For example the change in parameters in between the attraction and presentation modes may be proportional to the distance to the viewer.

In the attraction mode full saturated colors may be used as accent lighting. Alternatively, less saturated colors which are near (but preferably not on) the blackbody line may be used to create hyper-saturated color impressions of the product in the display. Using an RBG color mixing spotlight may be a way to realize such embodiments.

The color(s) of the decorative background lighting may be matched with the color of the product in the display. To implement such embodiments, the color of the product may be measured via a sensor. For example, monochromatic color harmonies, complementary color harmonies, or other color harmony rules can be used to create multiple colors for use in such matching.

Figures 3A, 3B:
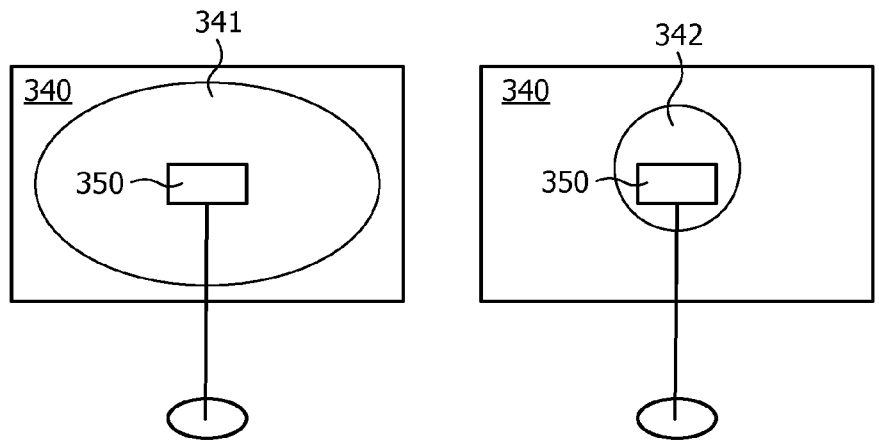
FIGS. 3A and B are schematic illustrations showing two different settings of an example lighting arrangement according to some embodiments of the invention.

FIGS. 3A and 3B show two different settings of an example lighting arrangement according to some embodiments of the invention. The lighting arrangement of FIGS. 3A and 3B is used to display a product 350. The lighting arrangement comprises accent light sources (not shown) and a back wall surface 340 with RGB lighting elements, which serves as a decoration light source.

FIG. 3A illustrates an example attraction mode setting, which may be used when a detected distance from a sensor (not shown) to a viewer is larger than a predetermined value. In this example attraction mode the decorative lighting realized by the RGB lighting elements 340 may comprise illuminating a large area 341 around the product 350 (possibly using intense color(s), pattern(s), and/or dynamics).

FIG. 3B illustrates an example presentation mode setting, which may be used when a detected distance from a sensor (not shown) to a viewer is smaller than a predetermined value (which may or may not be the same as for the attraction mode above). In this example presentation mode the decorative lighting, realized by the RGB lighting elements 340, may illuminate a smaller area 342 around the product 350 (possibly using increased brightness and/or less intense, or no, color(s), pattern(s), and/or dynamics).

Again, the change between the modes may be gradual in that the decoration shape may gradually shrink when a viewer approaches.

As an alternative to the RGB lighting elements 340 the decorative lighting can be realized by using a LED panel where each LED can be controlled individually as a back panel behind the product. In some embodiments, a back wall may consist of multiple LED panels, e.g. one centered behind the product, and others surrounding it. In such embodiments, all panels may be switched on in an attraction mode whereas only the center panel(s) may be active in a presentation mode.

In some embodiments of the invention, an attraction mode is created by changing light effects (e.g. brightness, intensity, color, hue, saturation, illumination area) and/or by having a dynamic lighting of a surface panel (e.g. changing color, pattern). Multiple light sources and/or controllable directional spotlights may be used to create a movement of light effects in the display area. In such embodiments, a presentation mode may be created by non-changing pure illumination of a product.

Figure 4:
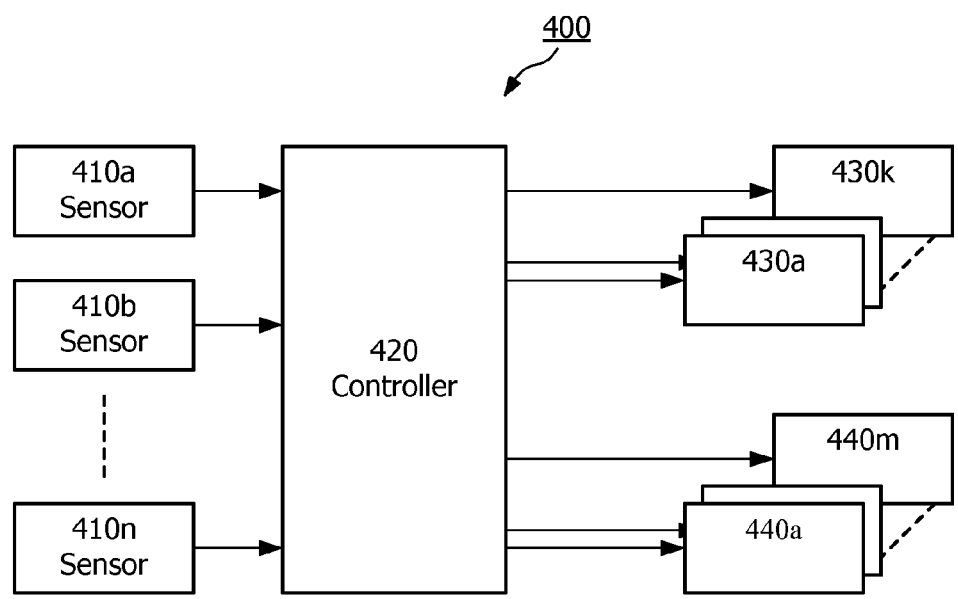
FIG. 4 is a block diagram illustrating an example lighting arrangement according to some embodiments of the invention.

FIG. 4 is a block diagram illustrating an example lighting arrangement 400 according to some embodiments of the invention. The lighting arrangement 400 comprises one or more distance sensors 410a-n, a controller 420, an accent lighting assembly comprising one or more accent light sources 430a-k and a decoration lighting assembly comprising one or more decoration light sources 440a-m.

The sensors 410a-n are arranged to detect (measure) a distance from the respective sensor to an object (e.g. a viewer). Each sensor generates a signal representing the detected distance and the signals are conveyed to the controller 420. The sensors may generate such signals continuously, at regular intervals or when a change in distance is detected.

The controller 420 receives the signal(s) generated by the sensor(s) and adapts—based on the signal value(s)—at least one light characteristic of the accent lighting assembly and at least one light characteristic of the decoration lighting assembly. The adaptation is performed via generation of one or more control signals. A control signal may control one or more light source and/or one or more light characteristic.

The controller 420 evaluates the received signal(s) and determines which particular mode (such as an attraction mode or a presentation mode) should be used for the accent lighting and the decoration lighting. In some embodiments, the controller may, in some situations, determine that no particular predetermined mode is to be used, but rather a transition setting between two modes (e.g. to obtain a gradual change from one mode to another mode as a function of the distance).

The example lighting arrangement 400 may, for example, perform method steps as will be explained in connection to FIGS. 5A-D and the controller may, for example, use transition functions as will be explained in connection to FIGS. 6A-D.

FIGS. 5A-D are flowcharts illustrating example method steps according to some embodiments of the invention.

FIG. 5A illustrates an example method 500 according to some embodiments of the invention. The method 500 is applicable to lighting arrangements comprising a single distance sensor. In step 510, the sensor detects a distance between an object (e.g. a viewer) and the sensor. The sensor correspondingly generates a signal representing the detected distance in step 520. As mentioned before, such a signal may be generated continuously, at regular intervals or when a change in distance is detected. The generated signal is conveyed to a controller, which receives the signal in step 530. In step 550, the controller generates one or more control signals in dependence of the received signal. The one or more control signals may be generated continuously, at regular intervals or when a change in a parameter for a lighting characteristic is desired. In step 560, the one or more control signals are used to adapt the light characteristic(s) of an accent lighting assembly and a decoration lighting assembly.

FIG. 5B illustrates an example method 500' according to some embodiments of the invention. The method 500' is applicable to lighting arrangements comprising a plurality of distance sensors. In step 510', each of the sensors detects a distance between an object and the sensor. Note that the object to which the distance is detected by each the sensors may be the same object for several of the sensors or may be different objects (e.g. different viewers) for some or all of the sensors. Each sensor correspondingly generates a signal representing the detected distance in step 520'. The signals may be generated continuously, at regular intervals or when a change in distance is detected. The generated signals are conveyed to a controller, which receives the signals in step 530'. In step 540', the controller determines which signal represents the smallest distance and selects this signal for the further processing of the lighting arrangement. As mentioned above, other criteria may alternatively be used for selecting a signal or for determining a combination of signals to be used for the further processing of the lighting arrangement. In step 550', the controller generates one or more control signals in dependence of the selected signal (or signal combination). The one or more control signals may be generated continuously, at regular intervals or when a change in a parameter for a lighting characteristic is desired. In step 560', the one or more control signals are used to adapt the light characteristic(s) of an accent lighting assembly and a decoration lighting assembly.

Figure 5C:
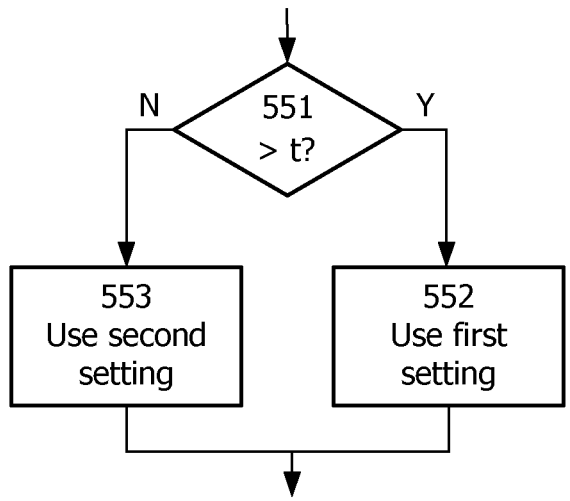

FIG. 5C illustrates method sub-steps that may be performed as part of any of the method steps 550 or 550' when one or more control signals are to be generated. In sub-step 551, a value of the (selected) distance representing signal is compared to a threshold t. If the signal value exceeds the threshold value (YES-path out of sub-step 551) a first parameter setting (for example, a setting creating an attraction mode) is used for the lighting characteristic(s) as indicated in sub-step 552. If the signal value does not exceed the threshold value (NO-path out of sub-step 551) a second parameter setting (for example, a setting creating a presentation mode) is used for the lighting characteristic(s) as indicated in sub-step 553.

In some embodiments, more than two modes (and consequently more than two settings and more than one threshold) may be applied.

Figure 5D:
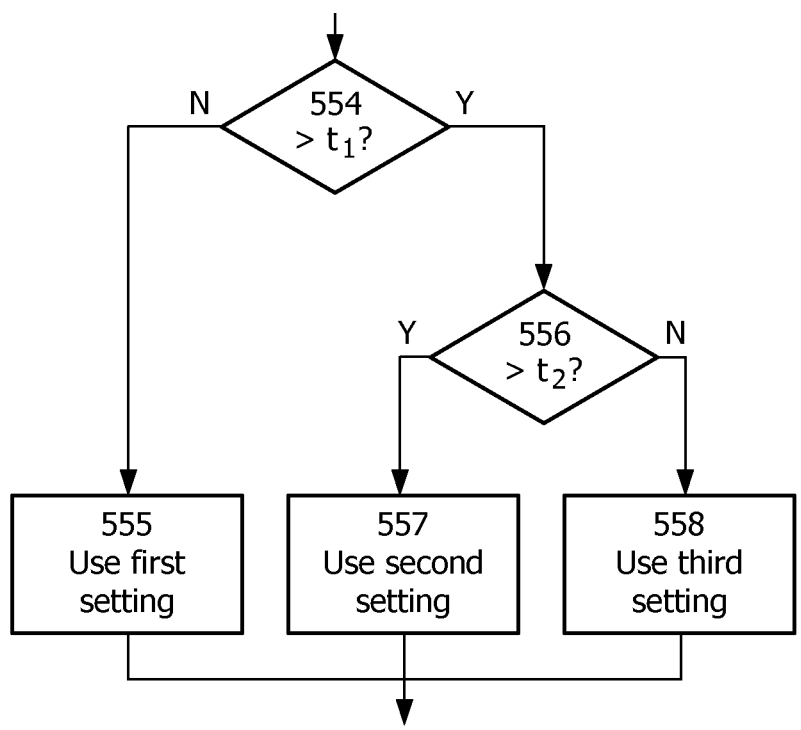

FIG. 5D also illustrates method sub-steps that may be performed as part of any of the method steps 550 or 550' when one or more control signals are to be generated. This embodiment employs two thresholds, two mode settings and a transition function. In sub-step 554, a value of the (selected) distance representing signal is compared to a first threshold $t_1$. If the signal value does not exceed the first threshold value (NO-path out of sub-step 554) a first parameter setting (for example, a setting creating a presentation mode) is used for the lighting characteristic(s) as indicated in sub-step 555. If the signal value exceeds the first threshold value (YES-path out of sub-step 554) the value of the (selected) distance representing signal is compared to a second threshold $t_2$ in sub-step 556. If the signal value exceeds the second threshold value (YES-path out of sub-step 556) a second parameter setting (for example, a setting creating an attraction mode) is used for the lighting characteristic(s) as indicated in sub-step 557. If the signal value does not exceed the second threshold value (NO-path out of sub-step 556) a third parameter setting is used for the lighting characteristic(s) as indicated in sub-step 558. The third parameter setting is determined as a function of the distance to create a transition between the first and second settings. The transition function may be the same for all the lighting characteristic parameters, or the parameters may have different transition functions. Example transition functions suitable for the method of FIG. 5D are illustrated in FIGS. 6A-B.

FIGS. 6A-D are plots illustrating example transition functions according to some embodiments of the invention. The x-axis represents the (selected) distance representing signal value, and threshold values are indicated thereon.

Figure 6A:
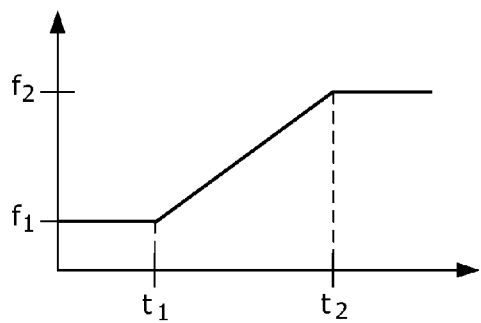
FIGS. 6A-D are plots illustrating example functions applied according to some embodiments of the invention.

FIG. 6A shows saturation values of a light source as a function of the signal value. When the signal value is below the first threshold (representing a small distance to a viewer) the saturation is set to a relatively low value $f_1$. When the signal value is above the second threshold (representing a large distance to a viewer) the saturation is set to a relatively high value $f_2$. If the signal value is between the first and second threshold, the saturation follows a straight line (affine) transition function through the points $(t_1, f_1)$ and $(t_1, f_1)$.

Figure 6B:
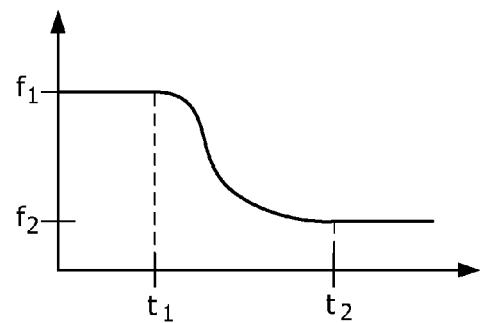

FIG. 6B shows intensity values of a light source as a function of the signal value. When the signal value is below the first threshold the intensity is set to a relatively high value $f_1$. When the signal value is above the second threshold the intensity is set to a relatively low value $f_2$. If the signal value is between the first and second threshold, the intensity follows a transition function (e.g. a polynomial function) having a zero derivative in the points $(t_1, f_1)$ and $(t_1, f_1)$.

Figure 6C:
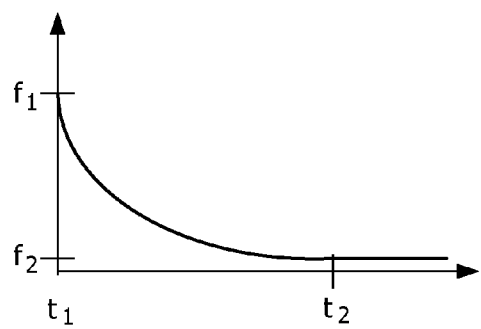

FIG. 6C shows lighting direction values of a light source as a function of the signal value. In this embodiment, the first threshold is set to zero. Hence, there is no presentation mode setting for this particular embodiment, and the comparison in sub-step 554 of FIG. 5D is not applicable. When the signal value is above the second threshold the lighting direction is set to $f_2$ (e.g. the light source pointing directly at the product). If the signal value is between zero and the second threshold, the lighting direction follows a transition function (e.g. a polynomial function) having a zero derivative in the point $(t_2, f_2)$ and passing through $(t_1, f_1)$.

Figure 6D:
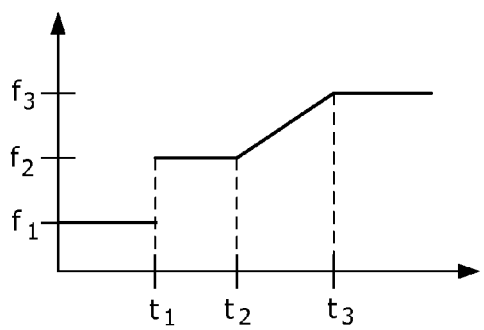

FIG. 6D shows beam angle values of a light source as a function of the signal value. In this embodiment, there are three thresholds and three modes. When the signal value is below a first threshold (representing a small distance to a viewer) the angle is set to a relatively low value $f_1$. When the signal value is between the first threshold and a second threshold the angle is set to a somewhat higher value $f_2$. When the signal value is above a third threshold (representing a large distance to a viewer) the angle is set to a relatively high value $f_3$. If the signal value is between the second and third threshold, the angle follows a straight line (affine) transition function through the points $(t_2, f_2)$ and $(t_3, f_3)$. Note that in this embodiment there is an abrupt transition between the first and second mode, while there is a gradual transition between the second and third mode.

It is to be understood that the transition functions, settings and thresholds illustrated in FIGS. 6A-D are merely presented as illustrative examples and that numerous variations are possible for different embodiments of the invention. For example, in some embodiments there are no predetermined modes and no thresholds (or the first threshold is equal to zero and the second threshold is equal to infinity) but merely a transition function (e.g. a square root function, a logarithmic function, an exponential function, or a polynomial function).

An instant switch between two modes at a certain threshold value has the advantage of simplicity. However, in some situations such an implementation may be experienced as disturbing for viewers, in particular if a viewer is crossing the threshold value repeatedly.

A gradual transition function between two modes has the advantage of being less flickery. However, linear interpolation (i.e. an affine transition function) may have a disadvantage in some embodiments, namely that when linear interpolation is done between two saturated hue values that are distant in the CIE 1931 xy color space (created by the International Commission on Illumination in 1931), this will lead to the use of many intermediate colors when the detected distance decreases, which may be experienced as disturbing. An alternative to linear interpolation may be created by first decreasing the saturation (towards a color close to blackbody line) while the hue is kept constant, then changing the hue, and finally increasing the saturation while the hue is kept constant (see also WO 2008/068713 A2). If this approach is used together with a discrete table of hue, saturation, and brightness values (e.g. with discrete steps that are perceived as equidistant, see WO 2008/068713 A2), the table samples that are used may be chosen such that they are linearly dependent on the detected distance.

In embodiments where the controller (or another calculation unit associated with the controller) calculates linear interpolations or another transition function between the lighting settings specified for two modes, a gradual transition is possible while a user of the lighting arrangement (e.g. a lighting designer, shop experience designer, a visual merchandiser, or a shop manager) only needs to specify lighting parameter settings for the two modes. In other embodiments the user may also have the possibility to specify the type of interpolation algorithm (i.e. the transition function).

In some embodiments, the lighting arrangement may be preprogrammed with a number of predefined settings and/or transition functions, and a user has the possibility to choose between those predefined settings and functions.

In some embodiments there may be a possibility to select or download new settings from a remote location (e.g. from a remote server, for example, at the headquarters of a retail chain).

Some embodiments may offer a combination of selecting/downloading predefined settings/functions and the possibility for a user to define his or her own settings/functions.

To enable selecting/defining of settings and/or functions, the lighting arrangement may be provided with a user interface unit associated with the controller. To enable downloading of settings and/or functions, the lighting arrangement may also be provided with a communication interface unit associated with the controller. The communication interface may also enable uploading of new settings/functions to a remote location (e.g. a remote server).

Calibration may be advantageous when a new setting/function is defined, and fine tuning may be advantageous when selecting a predefined setting/function.

In some embodiments, a color rendering index sensor may be used in the lighting arrangement. A color rendering index sensor measures the spectrum of the light, and calculates (based on the measurement values) a color rendering index value that represents the quality of the color representation in this light. For example, daylight (sunlight) has a maximal color rendering index, rendering colors in the most natural by definition. In some embodiments, a high color rendering index is preferred in the presentation mode to safeguard a high quality realistic display of the product. This is especially applicable to display of fashion related products.

Although embodiments of the invention have been described above with reference to a product display in a sales or advertisement situation, it is to be noted that the invention is not limited to such situations. Contrarily, embodiments may be used in any product/object presentation. Examples of other product presentation situations include display of prizes and awards (in public or in a home environment), art display (in public or in a home environment), exhibit display in museums, etc. It is also noted that a product presentation is not limited to presentation of a single product, but may involve presentation of one or several products.

The described embodiments of the invention and their equivalents may be realized in any suitable form, e.g. software or hardware or a combination thereof. They may be performed by general-purpose circuits, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an arrangement comprising circuitry/logic or performing methods according to any of the embodiments of the invention.

According to some embodiments of the invention, a computer program product comprises a computer readable medium such as, for example, a diskette or a CD-ROM. The computer readable medium may have stored thereon a computer program comprising program instructions. The computer program may be loadable into a data-processing unit, which may, for example, be comprised in a controller. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in any of the FIGS. 5A-D.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention. Thus, although individually listed, a plurality of means, elements or method steps may be implemented by e.g. a single unit or processor.

The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Hence, although the present invention has been described above with reference to specific embodiments, it should be understood that the limitations of the described embodiments are merely for illustrative purpose and by no means limiting. Instead, the scope of the invention is defined by the appended claims rather than by the description, and all variations that fall within the range of the claims are intended to be embraced therein. Thus, other embodiments than the specific ones described above are equally possible within the scope of these appended claims.

It should be emphasized that the term "comprises/comprising" when used in this specification or in the claims is taken to specify the presence of stated features, integers, steps, or components, but does not preclude the presence or addition of one or more other features, integers, steps, components, or groups thereof.

Although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A lighting arrangement for presentation of a first object comprising:
   an accent lighting assembly, having at least one accent light characteristic, comprising at least one accent light generating device, and being arranged to provide illumination of the first object;
   a decoration lighting assembly, having at least one decoration light characteristic, comprising at least one decoration light generating device, and being arranged to provide background lighting of the first object;
   a plurality of sensors arranged to detect a distance between the sensor and a second object and to generate signal values representing the distance;
   a controller arranged to
   receive a respective signal value from each of the plurality of sensors, each respective signal value representing a respective distance and one of the respective signal values representing a smallest distance; and
   adapt the accent light characteristic and the decoration light characteristic based on the respective signal value representing the smallest distance.

2. The lighting arrangement of claim 1, wherein the at least one accent light generating device comprises at least one of: a lamp; a spotlight; a light emitting diode; a halogen luminary; a fluorescent luminary; and an incandescent luminary.

3. The lighting arrangement of claim 1, wherein the at least one decoration light generating device comprises at least one of: a light emitting diode—LED—display; a spotlight; a lamp; a plasma screen; RGB lighting elements; a LED panel; a pixilated LED panel; a light guide; an electronic display; a liquid crystal display—LED—screen; a three dimensional—3D—display; and an LCD projection.

4. The lighting arrangement of claim 1, wherein the accent light characteristic comprises at least one of:
   a hue;
   a saturation;
   a lighting direction;
   a beam angle;
   a lighting pattern; and
   a light dynamics.

5. The lighting arrangement of claim 4, wherein the decoration light characteristic comprises at least one of:
   an intensity;
   a hue;
   a saturation;
   a lighting direction;
   an illumination area;
   a lighting pattern; and
   a light dynamics.

6. The lighting arrangement of claim 1, wherein at least one sensor is adapted to:
   detect at least one of movement and temperature of the second object; and
   generate the signal value representing the distance based on the movement and/or temperature detection.

7. The lighting arrangement of claim 6, wherein the at least one sensor is adapted to:
   generate the signal value representing the distance when the movement and/or temperature detection indicates that the second object is a human.

8. A lighting arrangement for presentation of a first object comprising:
- an accent lighting assembly, having at least one accent light characteristic, comprising at least one accent light generating device, and being arranged to provide illumination of the first object;
- a decoration lighting assembly, having at least one decoration light characteristic, comprising at least one decoration light generating device, and being arranged to provide background lighting of the first object;
- a plurality of sensors arranged to detect a distance between the sensor and a second object and to generate a signal value representing the distance;
- a controller arranged to
  - receive the signal value from the at least one sensor and to adapt the accent light characteristic and the decoration light characteristic based on the signal value
  - compare the signal value to a threshold value;
  - if the signal value does not exceed the threshold value, set the accent light characteristic and the decoration light characteristic to a first predetermined setting; and
  - if the signal value exceeds the threshold value, set the accent light characteristic and the decoration light characteristic to a second predetermined setting.

9. A lighting arrangement for presentation of a first object comprising:
- an accent lighting assembly, having at least one accent light characteristic, comprising at least one accent light generating device, and being arranged to provide illumination of the first object;
- a decoration lighting assembly, having at least one decoration light characteristic, comprising at least one decoration light generating device, and being arranged to provide background lighting of the first object;
- a plurality of sensors arranged to detect a distance between the sensor and a second object and to generate a signal value representing the distance;
- a controller arranged to
- receive the signal value from the at least one sensor and to adapt the accent light characteristic and the decoration light characteristic based on the signal value;
- compare the signal value to first and second threshold values;
- if the signal value does not exceed any of the first and second threshold value, set the accent light characteristic and the decoration light characteristic to a first predetermined setting;
- if the signal value exceeds the first and second threshold value, set the accent light characteristic and the decoration light characteristic to a second predetermined setting; and
- if the signal value exceeds the first threshold value and does not exceed the second threshold value, set the accent light characteristic and the decoration light characteristic to a third setting, wherein the third setting is a function of the signal value, and the function is such that, if the signal value shifts gradually from the first threshold to the second threshold the third setting shifts gradually from the first predetermined setting to the second predetermined setting.

10. A method of controlling a lighting arrangement for presentation of a first object comprising:
- detecting, at sensors of the lighting arrangement, a distance between the sensors and a second object;
- generating, at the sensors, a signal value representing the distance;
- receiving, at a controller of the lighting arrangement, the signal values from the sensors, each respective signal value representing a respective measurement, and one of the respective signal values representing a smallest measurement; and
- adapting, by generation at the controller of at least one control signal based on the respective signal value representing the smallest measurement:
  - an accent light characteristic of an accent lighting assembly, the accent light assembly comprising at least one accent light generating device, and being arranged to provide illumination of the first object; and
  - a decoration light characteristic of a decoration lighting assembly, the decoration lighting assembly comprising at least one decoration light generating device, and being arranged to provide background lighting of the first object.

* * * * *